(12) United States Patent
Usui

(10) Patent No.: US 6,833,092 B2
(45) Date of Patent: Dec. 21, 2004

(54) METHOD FOR CONTROLLING MOTOR-DRIVEN INJECTION MOLDING MACHINE

(75) Inventor: Kazuo Usui, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 164 days.

(21) Appl. No.: 10/216,867

(22) Filed: Aug. 13, 2002

(65) Prior Publication Data

US 2003/0038390 A1 Feb. 27, 2003

(30) Foreign Application Priority Data

Aug. 27, 2001 (JP) ........................................ 2001-255835

(51) Int. Cl.[7] .............................................. B29C 45/76
(52) U.S. Cl. ..................... 264/40.1; 264/328.1; 425/136
(58) Field of Search ............................. 264/40.1, 328.1; 425/135, 136; 700/200

(56) References Cited

U.S. PATENT DOCUMENTS 4,837,490 A * 6/1989 Neko .......................... 700/200
5,469,038 A * 11/1995 Silvey ........................ 700/200
6,144,182 A * 11/2000 Totani et al. .............. 264/40.5
6,572,797 B1 * 6/2003 Hibi et al. ................. 264/40.1
6,610,225 B2 * 8/2003 Usui et al. ................. 264/40.1

FOREIGN PATENT DOCUMENTS

JP         11-235743 A         8/1999

* cited by examiner

*Primary Examiner*—Jill L. Heitbrink
(74) *Attorney, Agent, or Firm*—Birch, Stewart, Kolasch & Birch, LLP

(57) ABSTRACT

In a method for controlling a motor-driven injection molding machine which includes a drive motor provided at a drive section, a load level of the drive section for each molding cycle is obtained in order to determine whether the load level has entered an overload region. When the load level has entered the overload region, cycle-time prolongation processing is performed in order to obtain a cycle prolongation time corresponding to the load level and to prolong the molding cycle by the cycle prolongation time.

11 Claims, 4 Drawing Sheets

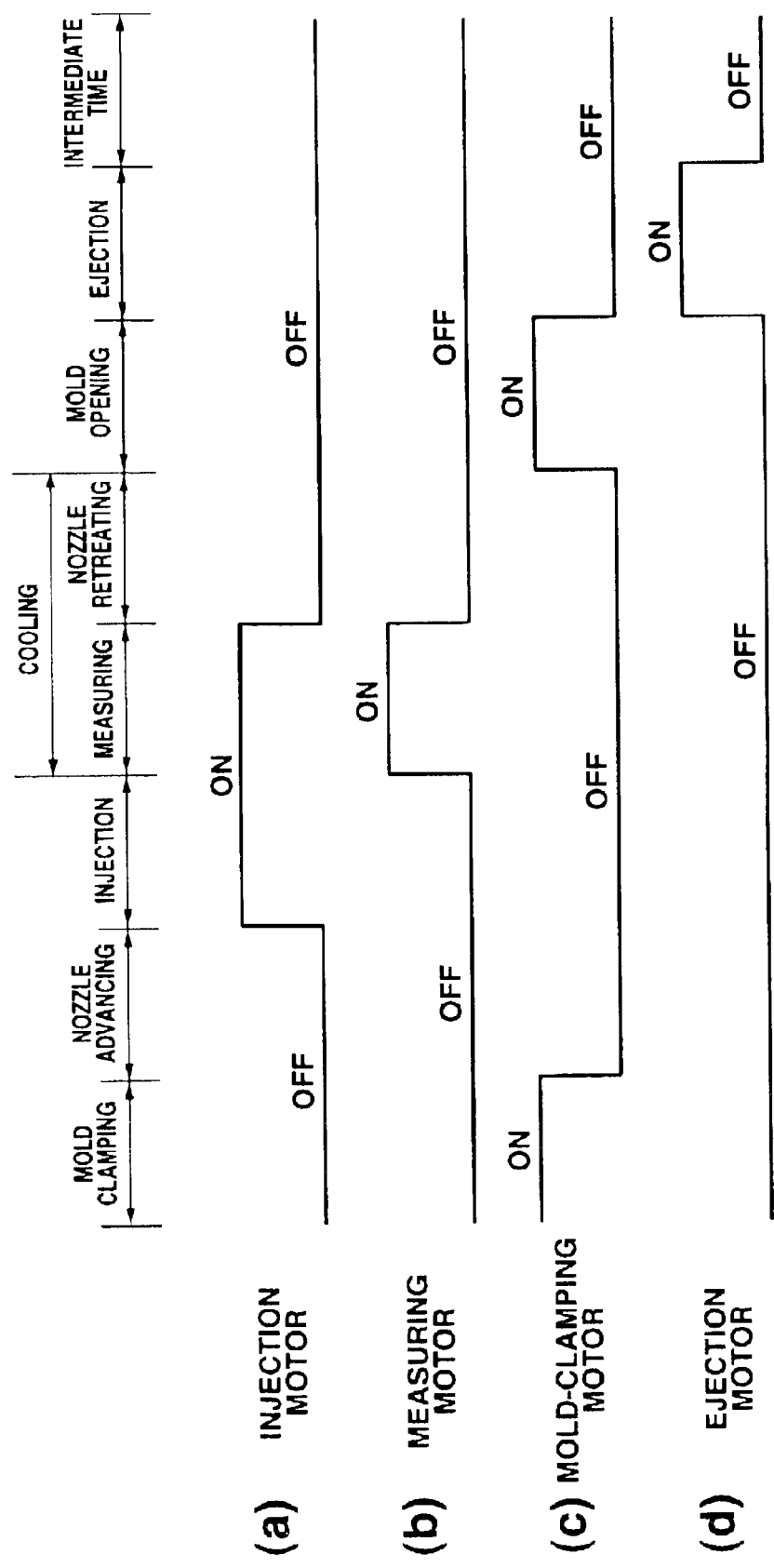

METHOD FOR CONTROLLING MOTOR-DRIVEN INJECTION MOLDING MACHINE

BACKGROUND OF THE INVENTION

1. Field of the Invention

The present invention relates to a motor-driven injection molding machine using a drive motor (servomotor) at a drive section.

2. Description of the Relevant Art

Generally, a motor-driven injection molding machine using a servomotor at a drive section potentially involves malfunction or breakage of the servomotor due to overheat arising under certain molding conditions or under a certain environment, since the servomotor generates heat according to load current. Therefore, the motor-driven injection molding machine usually employs measures for protection of the servomotor. Specifically, a heat generation value of the servomotor is detected. When the detected heat generation value reaches a preset stopping point, the value is interpreted as indicating overload, and the servomotor is forcibly stopped to thereby protect the servomotor.

For an injection molding machine, stoppage of a servomotor during molding means interruption of a molding process, which may have an adverse effect on the molding process once resumed; e.g., lowering the operating ratio. Therefore, interruption of a molding process must be avoided to the extent possible. In order to meet the end, for example, Japanese Patent Application Laid-Open (kokai) No. 11(1999)-235743 proposes a method for checking preset operating conditions. According to the proposed method, the injection molding machine is operated on a trial basis in order to judge, from load current flowing through a servomotor, whether or not the servomotor operates in an overloaded unstable region. When the servomotor operates in the overloaded unstable region, the preset operating conditions are reviewed so as to impart appropriate allowance thereto, to thereby avoid interruption of operation (molding process) during actual molding.

The above-mentioned conventional method involves the following problems.

First, since operating conditions are reviewed merely at the stage of trial operation, the review fails to reflect operating conditions during actual molding. Thus, unnecessary interruption of molding may occur, so that satisfactory stability and reliability cannot be attained.

Second, since the preset operating conditions are reviewed at the stage of trial operation so as to impart appropriate allowance thereto, the conventional method may fail to set optimum operating conditions, resulting in impaired molding quality or productivity.

SUMMARY OF THE INVENTION

An object of the present invention is to provide a method for controlling a motor-driven injection molding machine capable of reliably avoiding unnecessary interruption of molding, to thereby improve stability and reliability.

Another object of the present invention is to provide a method for controlling a motor-driven injection molding machine capable of always setting and maintaining optimum molding conditions to thereby avoid impairment in molding quality and productivity.

To achieve the above objects, the present invention provides a method for controlling a motor-driven injection molding machine which includes a drive motor provided at a drive section, the method comprising: obtaining a load level of the drive section for each molding cycle; determining whether the load level has entered an overload region; and performing, when the load level has entered the overload region, cycle-time prolongation processing in order to obtain a cycle prolongation time corresponding to the load level and to prolong a period of the molding cycle by the cycle prolongation time.

BRIEF DESCRIPTION OF THE DRAWINGS

FIG. 4 is a timing chart showing operation of drive motors provided in the drive section of the motor-driven injection molding machine.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of a motor-driven injection molding machine 1 capable of carrying out a control method according to the present embodiment will be described with reference to FIG. 3.

Figure 3:
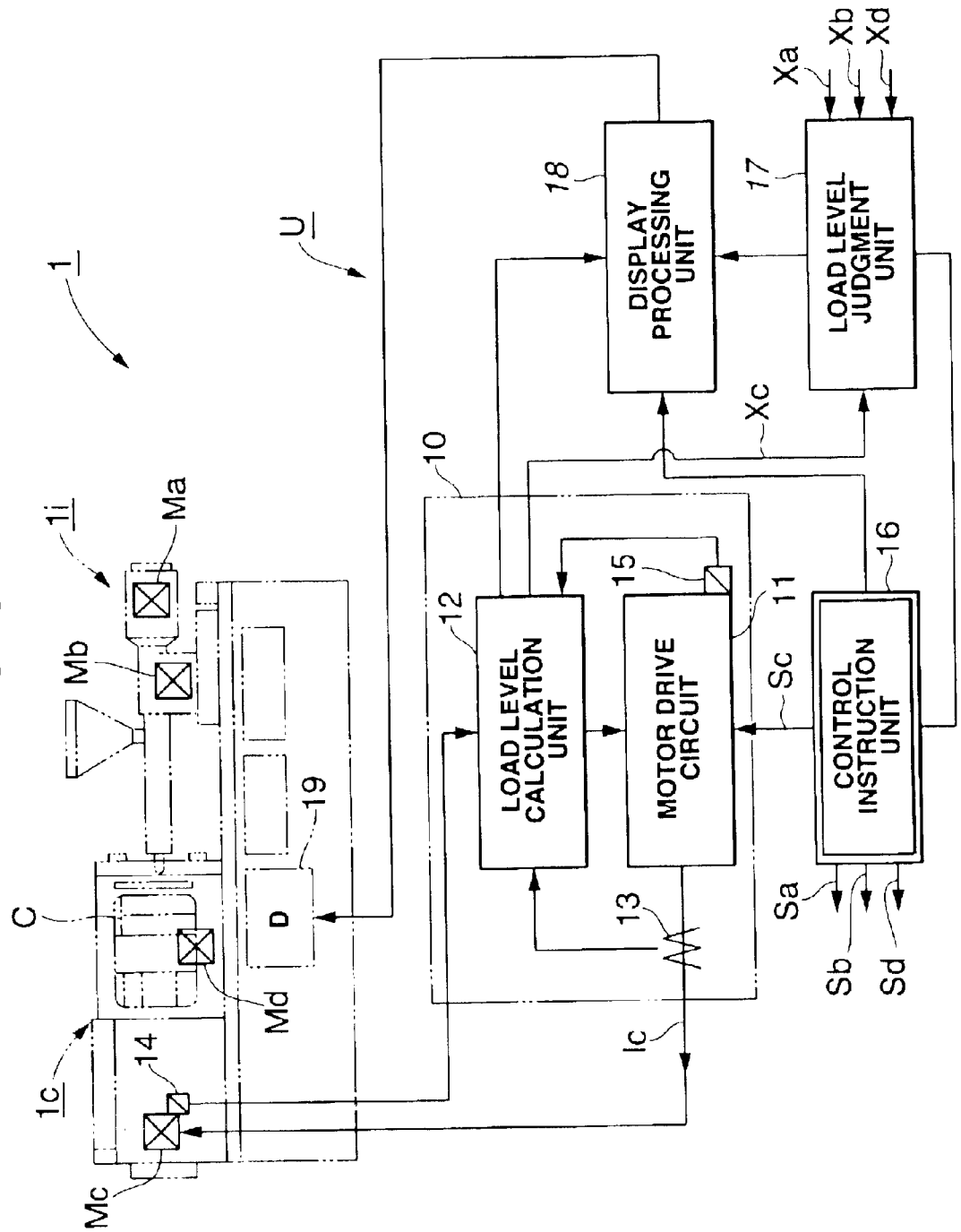
FIG. 3 is a block diagram of the control system of a motor-driven injection molding machine capable of carrying out the control method.

FIG. 3 shows a control system for controlling a mold-clamping motor Mc, which serves as a drive section of a mold-clamping mechanism installed in a mold-clamping unit 1c for clamping a mold C. Reference numeral 10 denotes a servoamplifier. The servoamplifier 10 includes a motor drive circuit 11 for driving the mold-clamping motor (servomotor) Mc, and a load level calculation unit 12 for obtaining load level Xc from load current Ic flowing through the mold-clamping motor Mc. In order to detect the magnitude of the load current Ic flowing through the mold-clamping motor Mc, a current sensor 13 is disposed in a connection line connecting the motor drive circuit 11 and the mold-clamping motor Mc.

Meanwhile, a first thermostat 14 is attached to the mold-clamping motor Mc in order to directly detect the temperature of the mold-clamping motor Mc. Upon detection of a preset temperature, the first thermostat 14 outputs an overload detection signal. A second thermostat 15 is attached to the motor drive circuit 11 in order to directly detect the temperature of the motor drive circuit 11. Upon detection of a preset temperature, the second thermostat 15 outputs an overload detection signal. The first thermostat 14 and the second thermostat 15 are connected to the load level calculation unit 12.

Reference character U denotes a controller having computer-processing functions. The controller U includes a control instruction unit 16 and a load level judgment unit 17, both of which operate under computer-processing functions, as well as a display processing unit 18. The load level calculation unit 12 supplies the load level Xc to the load level judgment unit 17. The load level judgment unit 17 supplies the result of judgment to the control instruction unit 16 and the display processing unit 18. The control instruction unit 16 supplies the motor drive circuit 11 with a control signal Sc for controlling the mold-clamping motor Mc. The load level calculation unit 12 is connected to the display processing unit 18 and the motor drive circuit 11. An output terminal of the display processing unit 18 is connected to a display 19.

In addition to having the mold-clamping motor Mc, the motor-driven injection molding machine 1 further includes other drive motors; specifically, as shown in FIG. 3, an injection motor (servomotor) Ma for moving forward and backward a screw of an injection unit 1$i$; a measuring motor (servomotor) Mb for rotating the screw of the injection unit 1$i$; and an ejection motor (servomotor) Md for ejecting a molded article from the mold C of the mold-clamping unit 1$c$. As in the case of the mold-clamping motor Mc, the motors Ma, Mb, and Md are connected to respective servo-amplifiers 10 similar to the servoamplifier 10 for the mold-clamping motor Mc. Accordingly, load level calculation units 12 of the respective servoamplifiers 10 supply the load level judgment unit 17 with a load level Xa of the injection motor Ma, a load level Xb of the measuring motor Mb, and a load level Xd of the ejection motor Md. The control instruction unit 16 supplies motor drive circuits 11 of the respective servoamplifiers 10 with a control signal Sa for controlling the injection motor Ma, a control signal Sb for controlling the measuring motor Mb, and a control signal Sd for controlling the ejection motor Md. Also, the motors Ma, Mb, and Md are equipped with respective first thermostats 14 similar to the first thermostat 14 for the mold-clamping motor Mc, and the motor drive circuits 11 are equipped with respective second thermostats 15 similar to the second thermostat 15 for the mold-clamping motor Mc. The first thermostats 14 and the second thermostats 15 are connected to the corresponding load level calculation units 12.

Figure 1:
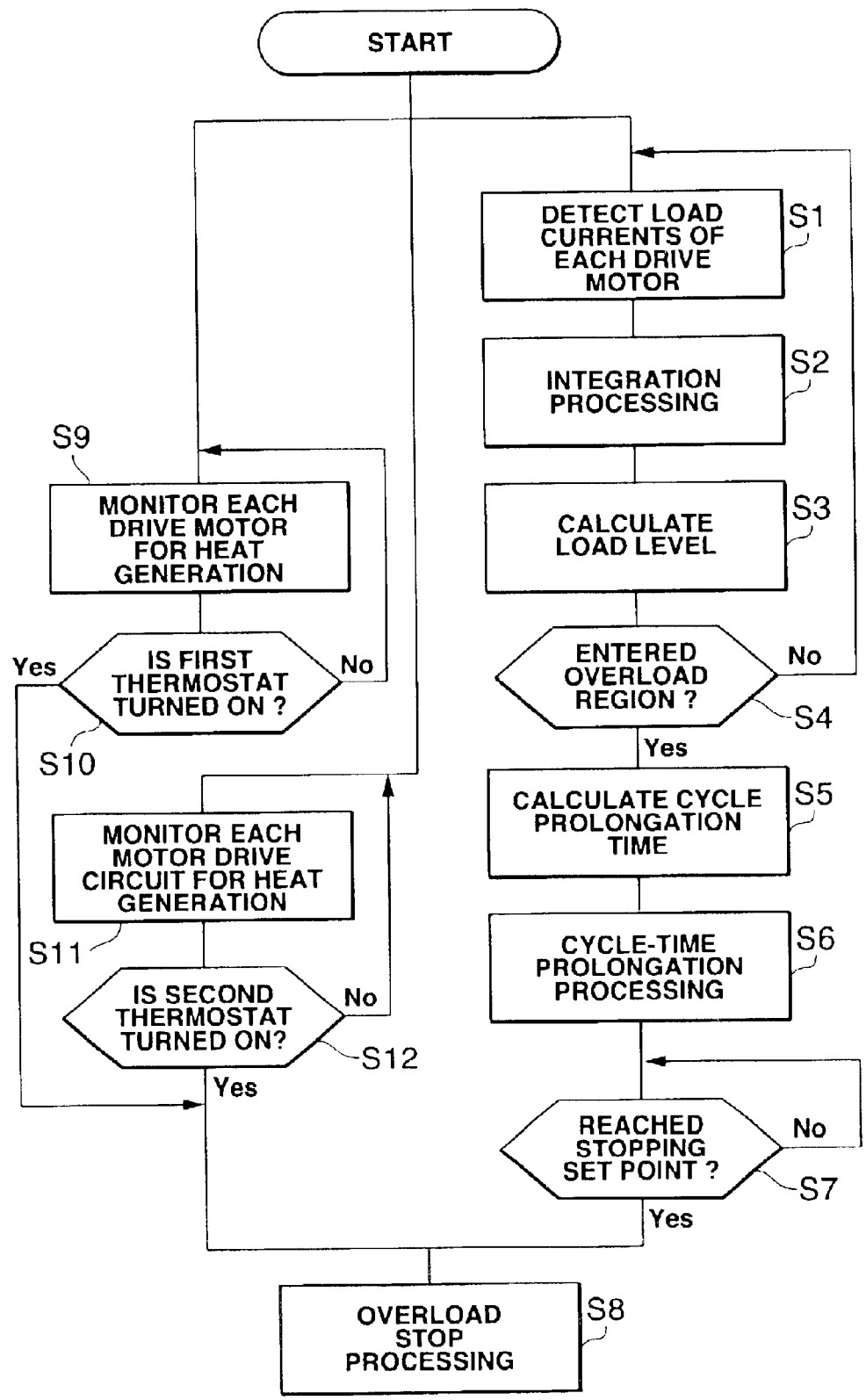
FIG. 1 is a flowchart showing the steps of a control method according to an embodiment of the present invention.
Figure 2:
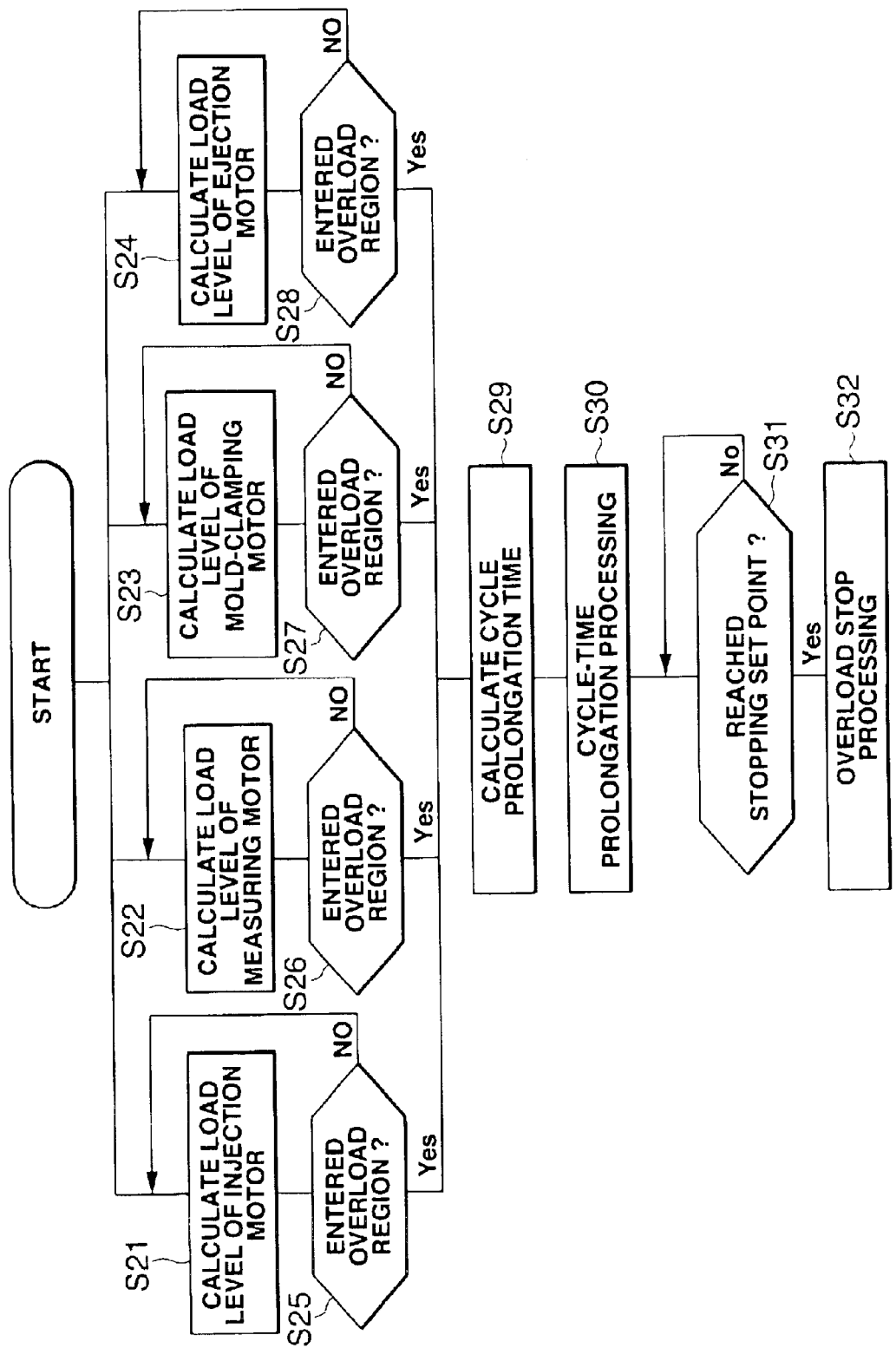
FIG. 2 is a flowchart showing the steps of the control method, focusing on processing performed for respective drive motors.

A method for controlling the motor-driven injection molding machine 1 according to the present embodiment will next be described in accordance with the flowcharts of FIGS. 1 and 2 and with reference to FIGS. 3 and 4.

FIG. 4 is a timing chart showing operation of the injection motor Ma, the measuring motor Mb, the mold-clamping motor Mc, and the ejection motor Md. In FIG. 4, an OFF period does not necessarily mean interruption of electric supply to the motor Ma, Mb, Mc, or Md, but may mean no-load operation of the same.

Description below assumes that a normal molding process is performed. As shown in section (c) of FIG. 4, the mold-clamping motor Mc is operated (as represented by an ON) in a mold-clamping stage (including a mold-closing stage) and in a mold-opening stage, while the load current Ic flows to the mold-clamping motor Mc; and the mold-clamping motor Mc is stopped (as represented by an OFF) in other stages. In an ON period during which the mold-clamping motor Mc is operated, the load level Xc is obtained on the basis of the load current Ic flowing through the mold-clamping motor Mc.

First, the load current Ic is detected by means of the current sensor 13 (step S1). The load level calculation unit 12 is informed of the detected load current Ic and obtains the load level Xc through calculation. That is, the square of load (load current) during a single molding cycle is integrated with respect to time, and the load level Xc is obtained from the root-mean-square value (average value) thereof (steps S2 and S3). Specifically, when a ratio to the maximum load at which continuous operation is possible is represented by X%, the load level Xc during a single molding cycle is obtained by $Xc = x_1^2 \cdot t_1 + x_2^2 \cdot t_2 + x_3^2 \cdot t_3 \ldots x_n^2 \cdot t_n$.

Similarly, as shown in section (a) of FIG. 4, the injection motor Ma is operated (ON) during an injection stage and during a measuring stage, and is stopped (OFF) during other stages. As shown in section (b) of FIG. 4, the measuring motor Mb is operated (ON) during the measuring stage, and is stopped (OFF) during other stages. As shown in section (d) of FIG. 4, the ejection motor Md is operated (ON) during an ejection stage, and is stopped (OFF) during other stages. As shown in FIG. 2, as in the case of the mold-clamping motor Mc described above, the load level Xa of the injection motor Ma, the load level Xb of the measuring motor Mb, and the load level Xd of the ejection motor Md are obtained (steps S21, S22, S23, and S24).

The obtained load levels Xa, Xb, Xc, and Xd are supplied to the load level judgment unit 17. The load level judgment unit 17 monitors the received load levels Xa, Xb, Xc, and Xd, and judges whether any of the load levels Xa, Xb, Xc, and Xd has entered an overload region (step S4). When the load level judgment unit 17 judges that any one of the load levels Xa, Xb, Xc, and Xd has entered the overload region, the load level judgment unit 17 supplies an overload signal to the control instruction unit 16. In response to the overload signal, the control instruction unit 16 calculates a cycle prolongation time ta, tb, tc, or td (step S5). Here, it is assumed that for the drive section using the mold-clamping motor Mc, an overload level Xf used for judgment as to whether the load level Xc has entered the overload region is set to 95%. In this case, when the load level Xc as measured over a single molding cycle has exceeded 95%, the control instruction unit 16 calculates a cycle prolongation time tc. This cycle prolongation time tc can be obtained by the following expression:

$$tc = K \cdot [\{Xc/(0.95)^2\} - 1] \cdot tm$$

where K is a coefficient, and tm is the length of a single molding cycle.

The value of K can be obtained through, for example, an experiment, and is chosen in such a manner that overload does not occur as a result of setting the cycle prolongation time tc obtained from the above expression. The same processing is performed for other load levels Xa, Xb, and Xd (steps S25, S26, S27, S28, and S29).

Subsequently, cycle-time prolongation processing for prolonging the period of the molding cycle is performed by use of the thus-obtained cycle prolongation time ta, tb, tc, or td. (steps S6 and S30). That is, set data are changed in order to increase the time length set for a section during which all the drive motors Ma, Mb, Mc, and Md are stopped or for a section during which the load levels Xa, Xb, Xc, and Xd are considerably low. Specifically, the set data are changed in order to increase the time length(s) set for one or more sections selected from the section before start of measuring, the section before start of mold opening/closing, and the section before start of a next cycle. This cycle-time prolongation processing may be performed automatically or manually. In the case of manual operation, an operator can determine at his/her discretion whether to perform the cycle-time prolongation processing. In the case in which the cycle-time prolongation processing has been performed automatically, this fact is written in an event log file and is displayed by means of the display unit 19. Moreover, the load levels Xa, Xb, Xc, and Xd and the cycle prolongation times ta, tb, tc, and td are supplied to the display processing unit 18, so that these values are displayed by means of the display unit 19. Since this operation enables the operator to monitor load conditions in real time, the operator can determine the possibility of entering the overload region and how long it would take to leave the overload region. The above-described processing is repeatedly performed for each molding cycle.

As a result of performance of the cycle-time prolongation processing as described above, the period of time during which the motors Ma, Mb, Mc, and Md are stopped is prolonged; i.e., cooling time is prolonged. After the molding cycle is thus prolonged, the load level judgment unit 17 continues monitoring the load levels Xa, Xb, Xc, and Xd. Upon the relevant load level(s) dropping below the overload level Xf, the prolonged molding cycle may be returned to the previous molding cycle before performance of the cycle-time prolongation processing. Alternatively, the prolonged molding cycle may be shortened according to the difference between the load level Xa, Xb, Xc, or Xd and the overload level Xf in such a manner that the shortened molding cycle does not become shorter than the molding cycle before performance of the cycle-time prolongation processing.

Thus, if an increase in the load level Xa, Xb, Xc, or Xd is transient, interruption of the molding process can be avoided. By contrast, if the load level Xa, Xb, Xc, or Xd continues increasing even after performance of the cycle-time prolongation processing and then reaches a preset stopping point Xs, a conceivable cause is not a mere transient increase in load level, but is some abnormality or trouble. Thus, at this point of time, the motors Ma, Mb, Mc, and Md are caused to stop (steps S7, S8, S31, and S32). The stopping point Xs is previously set in the load level judgment unit 17 and is used to stop the motors Ma, Mb, Mc, and Md when the motor Ma, Mb, Mc, or Md has entered an overload state which cannot be resolved through performance of the cycle-time prolongation processing.

Meanwhile, the first thermostats 14 and the second thermostats 15 directly monitor heat generated by the motors Ma, Mb, Mc, and Md and that from the motor drive circuits 11 (steps S9 and S11). Through combination of the direct monitoring of heat generation and the above-described indirect monitoring of heat generation on the basis of the load levels Xa, Xb, Xc, and Xd obtained from the corresponding load currents Ic, dual protection is implemented. For example, indirect monitoring of heat generation on the basis of the load levels Xa, Xb, Xc, and Xd may fail to detect an overload state when a great increase in motor temperature is caused by a change in ambient atmosphere (room temperature). Thus, when any one of the thermostats 14 and 15 outputs a signal indicative of overload, the overload stop processing is performed in order to stop the molding cycle (steps S10, S12, and S8). In the present embodiment, setting is performed such that when the molding apparatus is used at an appropriate ambient temperature, an overload state is first detected through monitoring on the basis of the load levels Xa, Xb, Xc, and Xd and is then detected by the thermostats 14 and 15.

According to the method for controlling a motor-driven injection molding machine according to the present embodiment, when the load level Xa, Xb, Xc, or Xd has entered an overload region, cycle-time prolongation processing is performed in order to obtain a cycle prolongation time ta, tb, tc, or td corresponding to the load level Xa, Xb, Xc, or Xd and prolongs the period of the molding cycle by the cycle prolongation time ta, tb, tc, or td. Therefore, interruption of molding can be avoided. In particular, since the status of operation during actual molding can be reflected directly, unnecessary interruption of molding can be avoided reliably to thereby improve stability and reliability. Although prolongation of the cycle time increases the molding time to thereby lower productivity, the control method of the present embodiment can avoid the problem of unnecessarily lowered productivity, because the molding cycle time is not prolonged by a constant time unconditionally, but is prolonged by a necessary time corresponding to the load level Xa, etc. In addition, since the remaining molding conditions are not changed, optimum molding conditions can be maintained at all times to thereby avoid impairment in molding quality and productivity.

Since the cycle-time prolongation processing is performed in order to increase the time length set for a section during which all the drive motors are stopped or a section during which the load levels are considerably low, direct influences to molding conditions can be avoided. Moreover, when the load level reaches the stopping point after performance of the cycle-time prolongation processing, the drive motors are stopped. Therefore, the control method of the present invention can properly cope with both transient overload and overload caused by abnormality or trouble.

While the present invention has been described with reference to the preferred embodiment, the present invention is not limited thereto. Regarding structural details, shape, technique, among others, modifications and any omission or addition may be possible as needed without departing from the scope of the invention. For example, the above embodiment is described while mentioning the injection motor Ma, the measuring motor Mb, the mold-clamping motor Mc, and the ejection motor Md as drive motors, but is not meant to exclude motors in other section.

What is claimed is:

1. A method for controlling a motor-driven injection molding machine which includes a plurality of drive motors provided at a drive section, the method comprising the steps of:

obtaining a load level of the drive section for each molding cycle, wherein the load level is obtained by integrating, with respect to time, squared load current during a single molding cycle;

determining whether the load level has entered an overload region; and performing, when the load level has entered the overload region, cycle-time prolongation processing in order to obtain a cycle prolongation time corresponding to the load level and to prolong a period of the molding cycle by the cycle prolongation time, wherein the drive motors include an injection motor, a metering motor, a mold-clamping motor and an ejection motor.

2. A method for controlling a motor-driven injection molding machine according to claim 1, wherein the cycle prolongation time is obtained by the following expression: $tc = K \cdot [\{Xc/(Xf)^2\} - 1] - tm$ where tc is the cycle prolongation time, K is a coefficient, Xc is the load level; Xf is an overload level used for judgment as to ghether the load level has entered the overload region; and tm is a length of a single molding cycle.

3. A method for controlling a motor-driven injection molding machine according to claim 1, wherein the cycle-time prolongation processing is performed in such a manner that a section of the molding cycle in which all drive motors stop is prolonged.

4. A method for controlling a motor-driven injection molding machine according to claim 1, wherein the cycle-time, prolongation processing is performed In such a manner that a section of the molding cycle in which load levels of all drive motors are considerably low is prolonged.

5. A method for controlling a motor-driven injection molding machine according to claim 1, wherein the cycle-time prolongation processing is performed automatically.

6. A method for controlling a motor-driven injection molding machine according to claim 1, wherein the cycle-time prolongation processing is performed manually.

7. A method for controlling a motor-driven injection molding machine according to claim 1, further comprising the step of stopping the drive motors when the load level reaches a preset stopping level after performance of the cycle-time prolongation processing.

8. A method for controlling a motor-driven injection molding machine according to claim 1, further comprising the step of displaying at least one of the load level and the cycle prolongation time by use of a display unit.

9. A method for controlling a motor-driven injection molding machine according to claim 1, further comprising the stops of:

monitoring the load level after performance of the cycle-time prolongation processing; and returning, when the load level becomes less than an overload level used for judgment as to whether the load level has entered the overload region, the period of molding cycle to that before performance of the cycle-time prolongation processing.

10. A method for controlling a motor-driven injection molding machine according to claim 1 further comprising the steps of:

monitoring the load level after performance of the cycle-time prolongation processing; and shortening, when the load level becomes less than an overload level used for judgment as to whether the load level has entered the overload region, the period of molding cycle according to the difference between the load level and the overload level in such a manner that the shortened molding cycle does not become shorter than the molding cycle before performance of the cycle-time prolongation processing.

11. A method for controlling a motor-driven injection molding machine which includes at least two drive motors provided at a drive section, the method comprising the steps of:

obtaining a load level of the drive section for each molding cycle, wherein the load level is obtained by Integrating, with respect to time, squared load current during a single molding cycle;

determining whether the load level has entered an overload region; and performing, when the load level has entered the overload region, cycle-time prolongation processing in order to obtain a cycle prolongation time corresponding to the load level and to prolong a period of the molding cycle by the cycle prolongation time, wherein the at least two drive motors includes at least two of an injection motor, a metering motor, a mold-clamping motor and an ejection motor.

* * * * *